F. K. CAMERON.
METHOD OF TREATING ALUNITE.
APPLICATION FILED JAN. 8, 1916.
1,233,977.
Patented July 17, 1917.
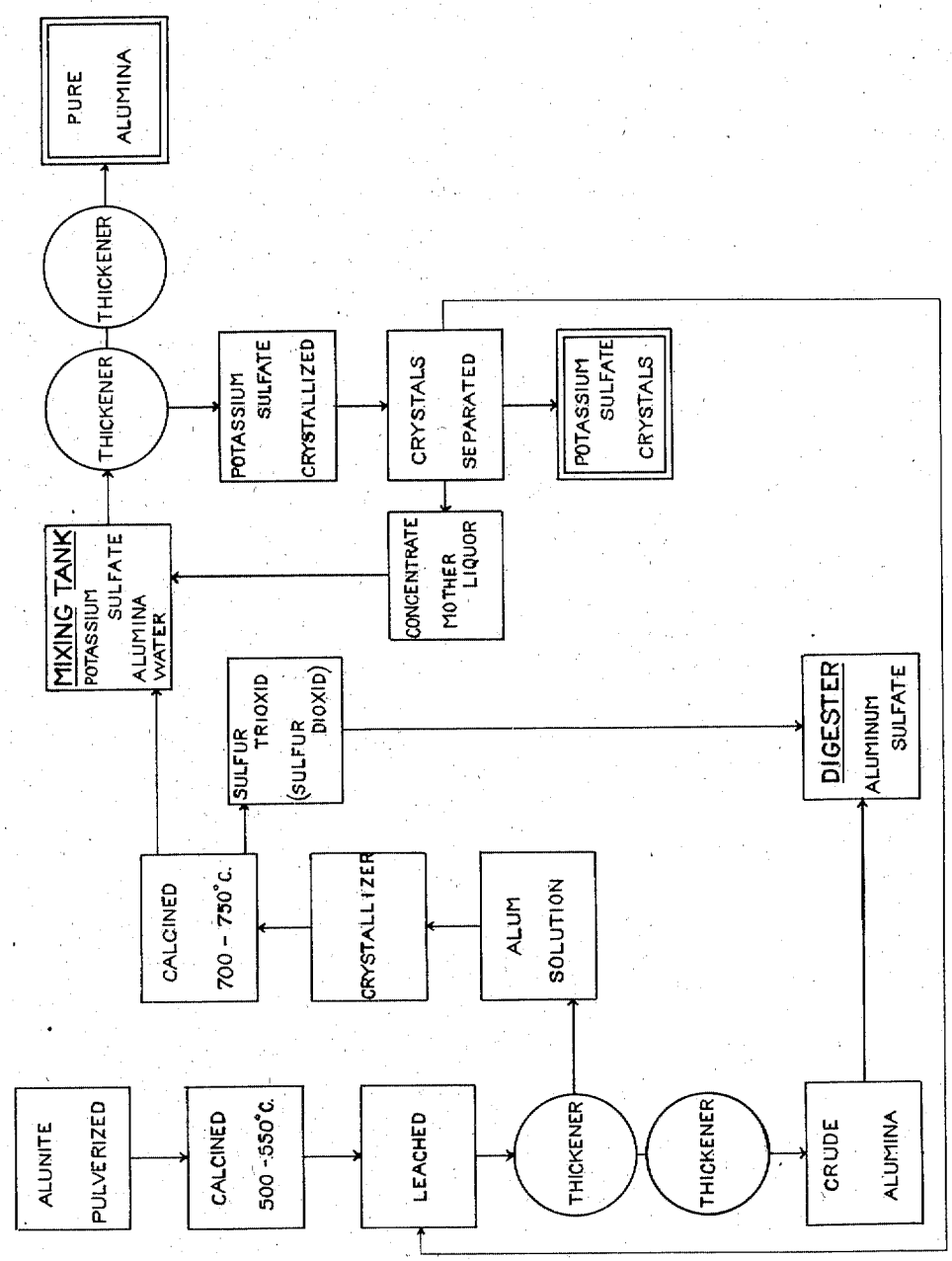
INVENTOR:
Frank K. Cameron
by Byrnes Townsend & Beckenstein
ATT'YS.

UNITED STATES PATENT OFFICE.

FRANK K. CAMERON, OF WASHINGTON, DISTRICT OF COLUMBIA.

METHOD OF TREATING ALUNITE.

1,233,977.  Specification of Letters Patent.  Patented July 17, 1917.

Application filed January 8, 1916. Serial No. 70,973.

*To all whom it may concern:*

Be it known that I, FRANK K. CAMERON, a citizen of the United States, residing at Washington, in the District of Columbia, have invented certain new and useful Improvements in Methods of Treating Alunite, of which the following is a specification.

This invention relates to methods of treating alunite or like minerals (alum rock, alum stone, etc.) for the purpose of producing therefrom, as merchantable products, potassium sulfate and substantially pure alumina, together with aluminum sulfate if desired.

It has been proposed heretofore to calcine alunite at a sufficient temperature to convert substantially all of the aluminum compounds into insoluble alumina, from which the postassium sulfate may be separated by leaching: Such processes, however, present the disadvantage that the insoluble alumina is associated with all other insoluble components of the rock or deposit, and requires special and supplemental processes for its purification and recovery. According to the present invention, on the contrary, a large proportion of the alumina of the alunite is recovered directly as a merchantable product.

My invention will be described by reference to a preferred specific embodiment thereof, reference being made to the accompanying drawing which illustrates diagrammatically the nature and sequence of the several steps.

The alunite or related mineral is first pulverized, preferably to 10–20 mesh and is then calcined at a carefully regulated temperature chosen with the object of converting the maximum practicable proportion of the alumina into water-soluble form, while avoiding substantial evolution of oxids of sulfur. For this purpose I prefer to use a rotary kiln of the type employed in cement mills, the temperature being maintained at 500 to 550° C. However, I do not desire to be restricted to the use of temperatures within these limits, inasmuch as the time of treatment also enters as a factor. The heating should not be so long continued as to drive off considerable volumes of the oxids of sulfur.

The calcined material is then treated with water, to which a small proportion of sulfuric acid may be added if necessary. The resulting mixture is treated in a so-called "thickener" which may be of the Dorr type, and the alum solution is continuously drawn off, crystallized out, and the crystals calcined at a materially higher temperature than that to which the original charge was subjected. The purpose of this calcination is to decompose the alum and to render its alumina content insoluble; this may be accomplished in a rotary kiln at a temperature of 700 to 750° C., the conditions being so chosen as completely to decompose the alum, while liberating the highest practicable proposition of sulfur trioxid. Under properly regulated conditions approximately 90 per cent. of the total evolved oxids of sulfur may consist of sulfur trioxid.

The crude alumina from which the alum solution was drawn is transferred to a digester, to which is also led the gas evolved from the calcination of the alum. The reaction in this digester yields aluminum sulfate, which may either be crystallized out and marketed as such, or may be crystallized and calcined with the alum, with production of alumina and sulfur trioxid.

The calcined material from the high-temperature kiln consists essentially of potassium sulfate and aluminum oxid. This is mixed with water with thorough agitation, and is passed through a second series of thickeners, from which there is discharged, as a residue, substantially pure alumina, which constitutes one of the merchantable products of the operation. The solution drawn from these thickeners consists essentially of potassium sulfate, which is crystallized out, the crystals being freed from mother liquor by filtration or draining, and dried, constituting another merchantable product. The mother liquor from the potassium sulfate crystals may be somewhat concentrated by evaporation, and returned to the mixing tank, which as before stated receives the charge from the high temperature or alum kiln. It is preferred, however, that this mother liquor should be returned to the alum leaching-system, in which, with such additions of water as may be required, it serves to dissolve the alum from the charge from the low-temperature calcination. By proceeding in this way its potassium sulfate contents are fully conserved, while at the same time the expense of evaporating it is avoided.

It will be understood that my invention is not restricted to the performance of all of the steps and manipulative processes above described, inasmuch as it is obvious that these may be variously modified without departing from the spirit of the invention. Nor is the invention restricted to the use of the particular types of apparatus which have been described above as well adapted for the practice of the method.

It will be understood that alum prepared in the first stage of the process may be marketed as such if so desired.

I claim:—

1. A method of treating alunite comprising calcining the same while so regulating the temperature and time of treatment as to convert the bulk of the alumina into water-soluble form while avoiding substantial evolution of oxids of sulfur, leaching the calcined material and separating alum from the solution thereby obtained, calcining the alum and thereby converting the same into potassium sulfate, alumina, and oxids of sulfur, the latter consisting predominately of sulfur trioxid, extracting and recovering the potassium sulfate, and recovering the residual alumina.

2. A method of treating alunite comprising calcining the same at about 500–550° C., thereby producing the maximum practicable proportion of soluble aluminum compounds with the minimum evolution of oxids of sulfur, leaching the calcined material and separating alum from the solution thereby obtained, calcining the alum at about 700–750° C., and thereby converting the same into potassium sulfate, alumina, and oxids of sulfur, extracting and recovering the potassium sulfate, and recovering the residual alumina.

3. A method of treating alunite comprising calcining the same while so regulating the temperature and time of treatment as to convert the bulk of the alumina into water-soluble form while avoiding substantial evolution of oxids of sulfur, leaching the calcined material and separating alum from the solution thereby obtained, calcining the alum and thereby converting the same into potassium sulfate, alumina, and oxids of sulfur, the latter consisting predominately of sulfur trioxid, absorbing the sulfur trioxid by the residue from the alum extraction for preparation of aluminum sulfate, extracting and recovering the potassium sulfate, and recovering the residual alumina.

In testimony whereof I affix my signature.

FRANK K. CAMERON.

It is hereby certified that in Letters Patent No. 1,233,977, granted July 17, 1917, upon the application of Frank K. Cameron, of Washington, District of Columbia, for an improvement in "Methods of Treating Alunite," an error appears in the printed specification requiring correction as follows: Page 1, line 69, for the word "proposition" read *proportion;* and that the said Letters Patent should be read with this correction therein that the same may conform to the record of the case in the Patent Office.

Signed and sealed this 14th day of August, A. D., 1917.

[SEAL.]

Cl. 23—13.

R. F. WHITEHEAD,
*Acting Commissioner of Patents.*